United States Patent

Dewey

[11] Patent Number: 5,879,197
[45] Date of Patent: Mar. 9, 1999

[54] JACK MODULE

[75] Inventor: James D. Dewey, Plymouth, Minn.

[73] Assignee: ADC Telecommunications, Inc., Minnetonka, Minn.

[21] Appl. No.: 971,275

[22] Filed: Nov. 17, 1997

[51] Int. Cl.[6] ................................................. H01R 17/18
[52] U.S. Cl. ........................................... 439/668; 439/188
[58] Field of Search ..................................... 439/188, 668; 200/51.1

[56] References Cited

U.S. PATENT DOCUMENTS

| | | | |
|---|---|---|---|
| 3,524,198 | 8/1970 | Malmstadt et al. | 361/737 |
| 3,852,703 | 12/1974 | Carney et al. | 439/372 |
| 4,134,631 | 1/1979 | Conrad et al. | 439/50 |
| 4,160,880 | 7/1979 | Brey | 439/571 |
| 4,204,095 | 5/1980 | DeLuca et al. | 439/527 |
| 4,548,447 | 10/1985 | Dinsmore | 439/43 |
| 4,548,453 | 10/1985 | Mummey et al. | 439/55 |
| 4,737,113 | 4/1988 | Hopper et al. | 439/78 |
| 4,770,639 | 9/1988 | Lau | 439/61 |
| 4,797,114 | 1/1989 | Lau | 439/79 |
| 4,820,200 | 4/1989 | Lau | 439/607 |
| 4,840,568 | 6/1989 | Burroughs et al. | 439/49 |
| 4,954,096 | 9/1990 | Frank | 439/346 |
| 4,975,087 | 12/1990 | Williams et al. | 439/668 |
| 5,078,624 | 1/1992 | Burroughs et al. | 439/668 |
| 5,145,416 | 9/1992 | Cruise et al. | 439/668 |
| 5,199,878 | 4/1993 | Dewey et al. | 439/49 |
| 5,393,249 | 2/1995 | Morgenstern et al. | 439/668 |
| 5,575,689 | 11/1996 | Baggett et al. | 439/709 |
| 5,618,199 | 4/1997 | Conorich et al. | 439/404 |
| 5,634,822 | 6/1997 | Gunell | 439/668 |
| 5,639,261 | 6/1997 | Rutkowski et al. | 439/534 |
| 5,647,043 | 7/1997 | Anderson et al. | 385/78 |
| 5,659,650 | 8/1997 | Arnett | 385/35 |

OTHER PUBLICATIONS

Brochure by Lucent Technologies entitled, "Exchange-Max® Your Central Office Cabling Solution," 5 pages, dated Apr. 1996.

Photographs of Lucent Technologies product.

Primary Examiner—Neil Abrams
Assistant Examiner—T C Patel
Attorney, Agent, or Firm—Merchant, Gould, Smith, Edell, Welter & Schmidt, P.A.

[57] ABSTRACT

A digital signal cross-connect module has a dielectric faceplate with a plurality of ports. The plurality of ports includes at least two linear arrays of ports each including a monitor jack port and two access ports. The arrays are positioned vertically and parallel to one another. The ports are divided into three transverse fields. All monitor ports are positioned in a first transverse field. The access ports are positioned in second and third transverse fields with the second and third transverse fields vertically offset from each other to increase a horizontal density of ports within the module.

10 Claims, 7 Drawing Sheets

JACK MODULE

BACKGROUND OF THE INVENTION

1. Field of the Invention

This invention pertains to jack modules for use in the telecommunications industry. More particularly, this invention pertains to a jack module for digital signal cross connect (DSX) applications.

2. Description of the Prior Art

Digital signal cross-connect modules (DSX) are well known in the telecommunications industry. An example of such may be found in U.S. Pat. No. 5,078,624 to Burroughs. et al. dated Jan. 7, 1992. FIG. 1 of that patent shows a module having a jack field located on the right hand side of the module and consisting of six columns of jack ports associated with individual Bantam jacks. The cross-connect field is located on a side of the module. FIGS. 4 and 5 show an alternative embodiment where the Bantam jacks are replaced with individual modules with jack assemblies such as those shown in U.S. Pat. No. 4,840,568. Each of the Bantam jacks or jack assemblies includes three ports—one of which is conventionally referred to as an IN port and the other is referred to as an OUT port. Further, the jack includes a monitor port for accessing a signal.

As discussed in U.S. Pat. No. 5,078,624, density is an important design consideration in digital signal cross-connect modules. In the aforementioned '624 patent, the modules are arranged for the jacks to have a horizontal axis as opposed to the vertical axis of previous designs.

The '624 patent shows a module where a cabinet contains a plurality of circuit elements. DSX designs are also known where a cabinet contains a plurality of individual modules each containing a dedicated circuit. Examples of such are shown in U.S. Pat. Nos. 5,199,878 and 5,393,249.

U.S. Pat. No. 4,975,087 to Williams et al. dated Dec. 4, 1990 teaches a DSX module to enhance horizontal density of vertical-axis Bantam jacks within a cabinet. The '087 patent forms flattened areas on barrels of the Bantam jacks to permit closer spacing of Bantam jacks. Achieving enhanced horizontal density is desirable since circuits including DSX jacks will include multiples of such jacks and is desirable that all such multiples be contained within a common cabinet.

SUMMARY OF THE INVENTION

According to a preferred embodiment of the present invention, a digital signal cross-connect module is disclosed. The module includes a dielectric face plate with ports formed through the face plate. The ports include at least two linear arrays of ports. Each of the arrays has a monitor-jack port and two access ports. The arrays are vertical arrays with adjacent arrays being parallel. The ports define three horizontal fields. An uppermost of the three fields is a monitor field containing the monitor ports. The second and third fields are access fields containing the access ports of adjacent arrays. The access fields are transversely offset.

DETAILED DESCRIPTION OF THE PREFERRED EMBODIMENT

Referring now to the several drawing figures in which identical elements are numbered identically throughout, a description of a preferred embodiment of the present invention will now be provided.

With initial reference to FIGS. 1–6, the module 10 according to a first embodiment of the present invention is shown. The module 10 includes a molded dielectric front portion 12 and a molded dielectric back plate 14. The front portion 12 includes a flat faceplate 16 having a flat forward face 18. Extending rearwardly from the faceplate 16 and perpendicular thereto are upper and lower walls 20, 22. The upper and lower walls 20, 22 include clips 24 to be received within detents 26 of upper and lower edges of the back plate 14. Accordingly, the front portion 12 and the back plate 14 may be joined to form a complete dielectric housing 11 (illustrated best in FIGS. 3 and 4) where the back plate 14, faceplate 16 and upper and lower walls 20, 22 cooperate to define a housing interior 13.

Figure 1:
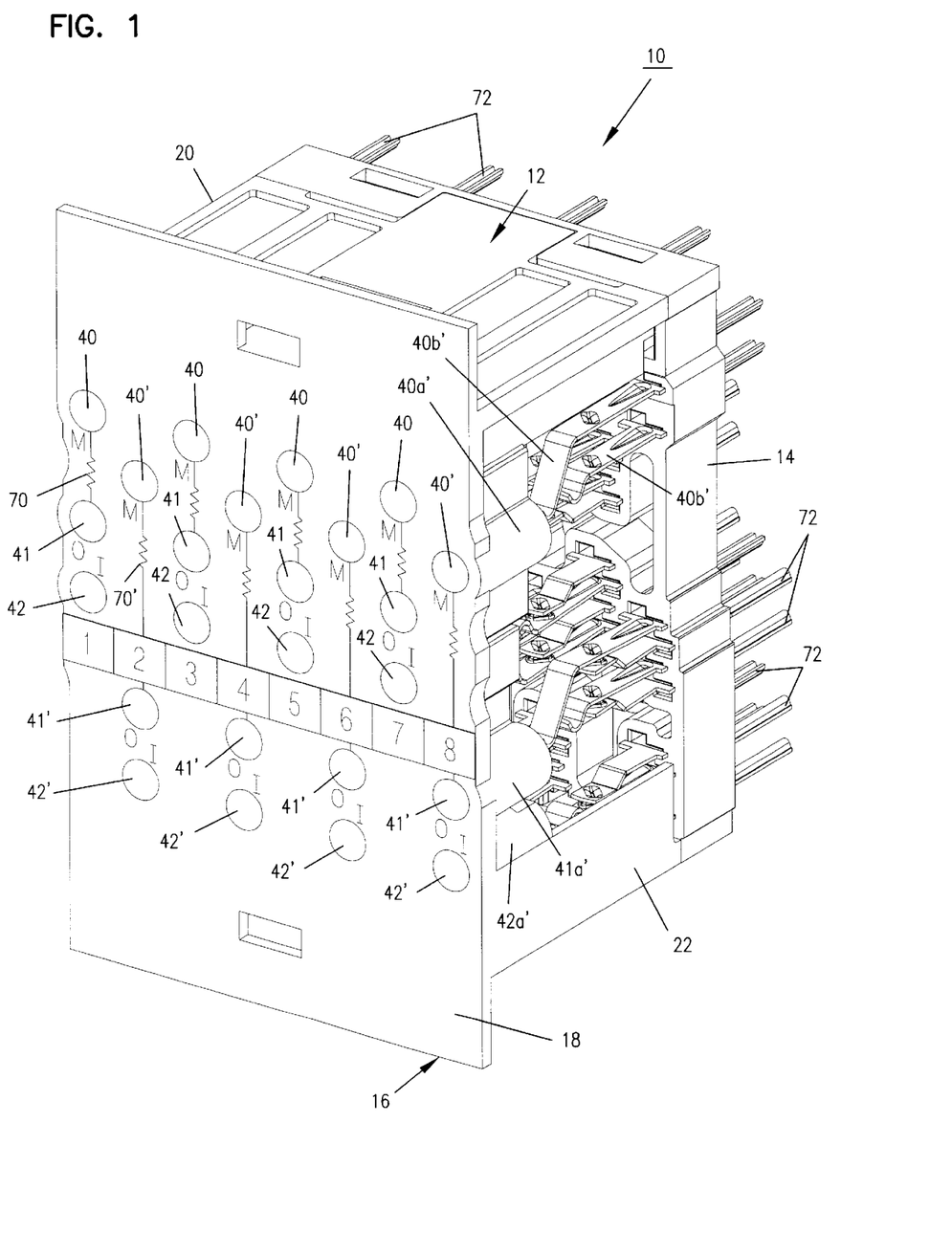
FIG. 1 is a front, top and right side perspective view of a digital signal cross-connect module according to the present invention.
Figure 2:
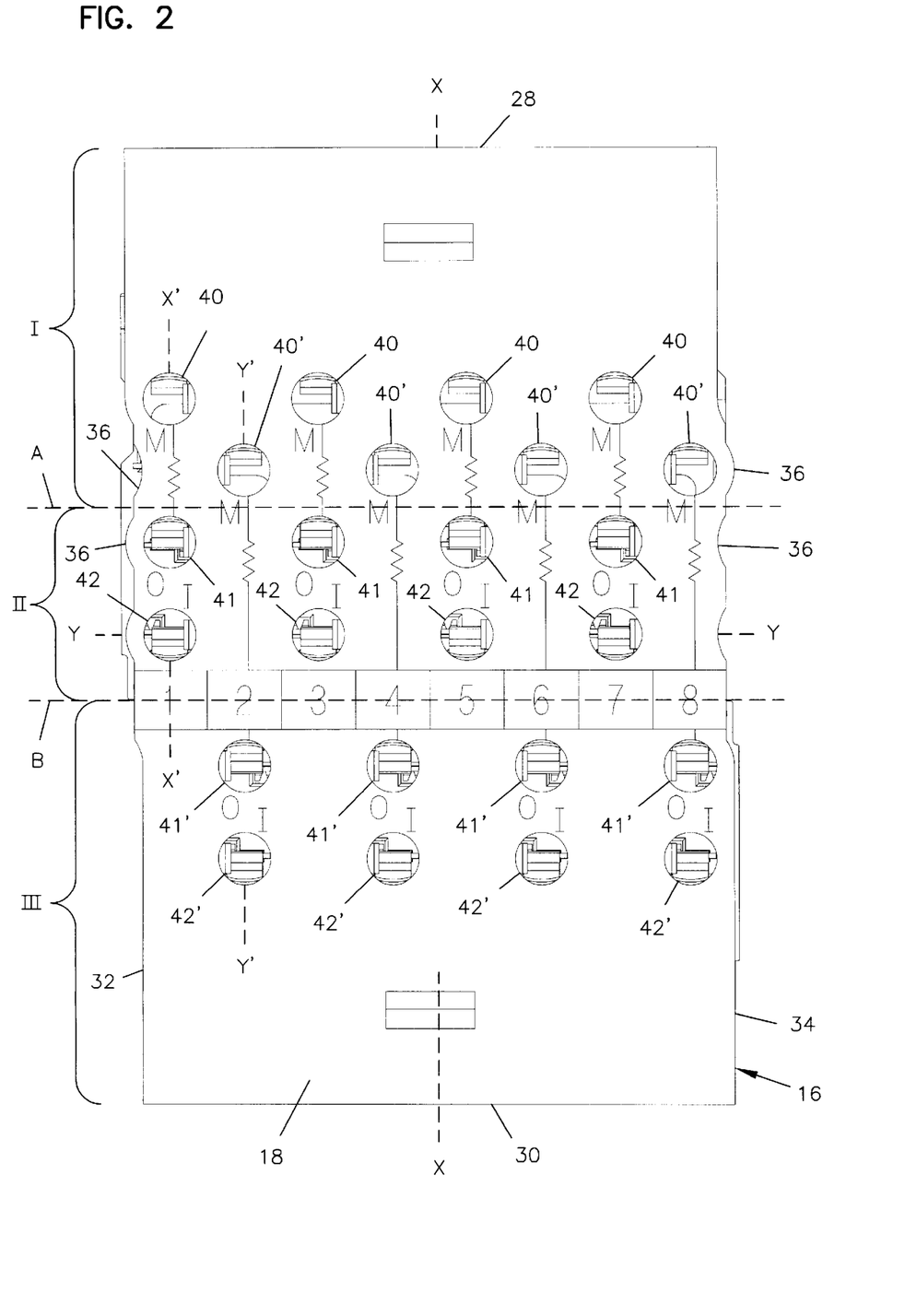
FIG. 2 is a front elevation view of the module of FIG. 1.

For purposes of defining orientation and relative orientation of elements, and with best reference to FIG. 2, the faceplate 16 has an upper end 28, a lower end 30 and spaced apart side ends 32, 34. As noted in the drawings, the side ends 32, 34 are not straight and include protrusions and recesses generally indicated at 36. The protrusions and recesses of side ends 32, 34 are complimentarily shaped such that the protrusions of a left side 32 may fit into the recesses of a right side 34 of an adjacent module 10 when modules 10 are disposed in side-by-side relation within a cabinet (not shown). To retain the module 10 within a cabinet, the top and bottom walls 20, 22 are provided with central clips 37 so that the modules 10 may be snap fit into a cabinet (not shown).

Having described the top and bottom ends 28, 30, and side walls 32, 38, the faceplate 16 has a longitudinal (or vertical) axis X—X and a transverse (or horizontal) axis Y—Y. The faceplate 16 includes a plurality of ports formed through the faceplate. Each of the ports is sized to receive a jack plug of conventional dimensions.

The plurality of ports includes linear arrays of ports including a first set of ports having vertical axes X'—X' and a second set of linear arrays having vertical axes Y'—Y'. Arrays of the first set include monitor jack ports 40, OUT jacks ports 41 and IN jack ports 42. Similarly, ports of the second set of arrays include monitor jack ports 40', OUT jack ports 41' and IN jack ports 42'. The arrays of the first and second sets are staggered such that the arrays of the first set (containing ports 40–42) are followed by arrays of the second set (containing ports 40'–42').

As indicated by the phantom lines A and B in FIG. 2, the plurality of ports define at least three transverse fields I, II and III. In the embodiment of FIGS. 1–6, the fields are positioned for the first field I to be a monitor field adjacent the upper end 28. The second field II is a first access field which is adjacent the monitor field I on a side thereof opposite the upper end 28. The third field III is a second access field adjacent the first access field II and adjacent the lower end 30.

The monitor field I contains the monitor ports 40, 40' of all arrays. The first access field II contains the OUT ports 41 and IN ports 42 of only the first set of arrays. The second access field III contains the OUT ports 41' and IN ports 42' of only the second set of arrays of ports.

With the construction as described, no port of an adjacent array is in transverse alignment with any port of an adjacent array. Instead, only ports of the first set of arrays are in transverse alignment (i.e., all of the monitor ports 40 are in transverse alignment and all of OUT ports 41 and IN ports 42, respectively, are in transverse alignment). Similarly, none of the ports of the second set of arrays are in transverse alignment with any of the ports of the first set of arrays. All of the monitor ports 40' of the second set are in transverse alignment and all of the OUT ports 41 ' are in transverse alignment and all of the IN ports 42' are in transverse alignment.

With the construction as described, the ports 40'–42' of the second set of arrays are staggered and offset relative to the ports 40–42 of the first set of arrays. Therefore, a closer transverse positioning of ports of adjacent arrays is attainable without the ports of the first and second arrays interfering with one another when jack plugs are inserted within the ports. Accordingly, a greater density of ports is possible for any transverse dimension (i.e., any dimension parallel to axis Y—Y).

Figure 5:
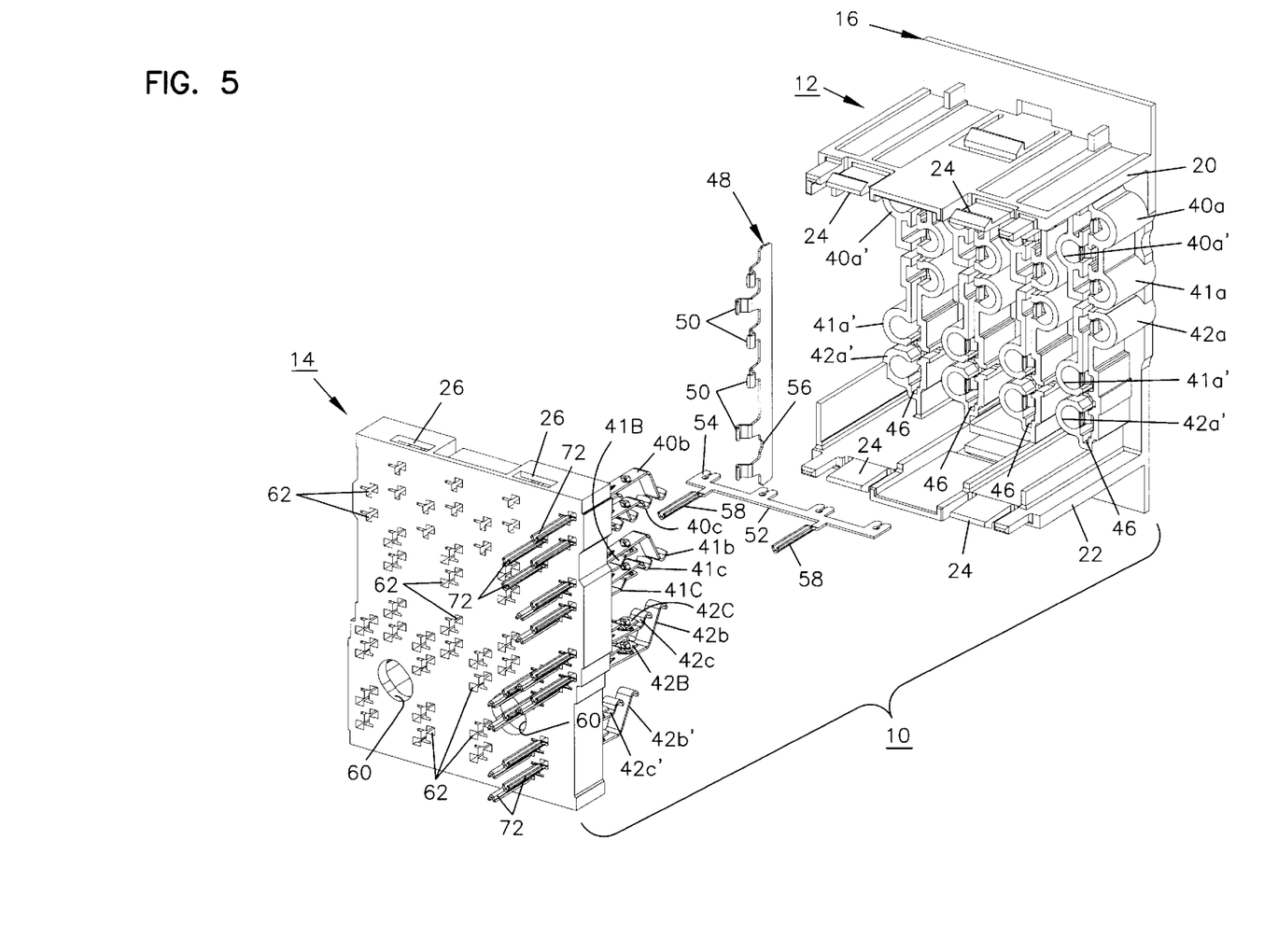
FIG. 5 is the perspective view of the module of FIG. 4 shown in exploded format and only showing spring contacts for two arrays of springs.
Figure 6:
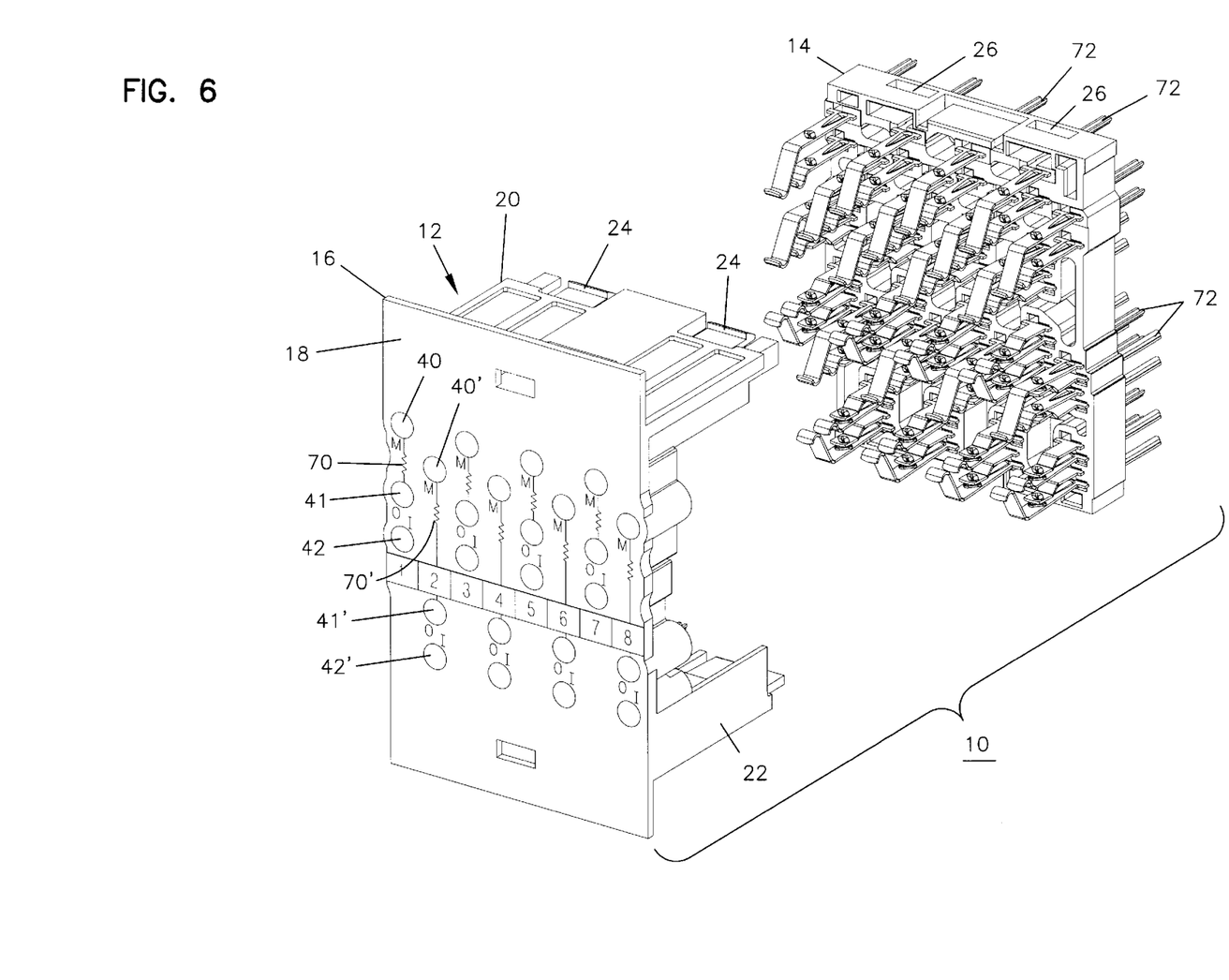
FIG. 6 is the view of FIG. 1 with a back plate removed in exploded format to expose spring contacts contained within the module.

Shown best in FIG. 5, the forward faceplate 16 is integrally molded with a plurality of barrels 40a–42a and 40a'–42a' associated with each of the ports 40–42 and 40'–42'. The barrels are sized to receive jack plugs. The lengths of the barrels retain and support the jack plugs which may be inserted within the ports.

Formed between the barrels are a plurality of vertical slots 46 sized to receive grounding clips 48. The grounding clips 48 include ground contacts 50 bent such that when the strips 48 are placed within the slots 46, individual ones of the clips 50 protrude into individual ones of the barrels 40a–42a and 40a'–42a'. As a result, when a jack plug is inserted into one of the ports, an outer cylindrical surface (or jacket) of the jack plug (which is electrically conductive) is in electrical contact with the clips 50. A ground bus clip 52 is provided with retaining clips 54 to secure onto a lower portion 56 of each of the ground clips 48 received within each of the four slots 46. Wire wrap termination pins 58 extend rearwardly from the bus clip 52. Accordingly, an electrically conductive wire (not shown) can be secured to the wire wrap pins 58 and to an electrical ground (not shown) such that each of the ground contacts 50 is electrically grounded to make a desired electrically grounded contact with any jack plug jacket inserted within each of the ports 40a–42a and 40a'–42a'. The back plate 14 contains enlarged holes 60 formed therethrough to permit access and to be aligned with the extending wire wrap termination pins 58 of the ground bus 52.

Figure 3:
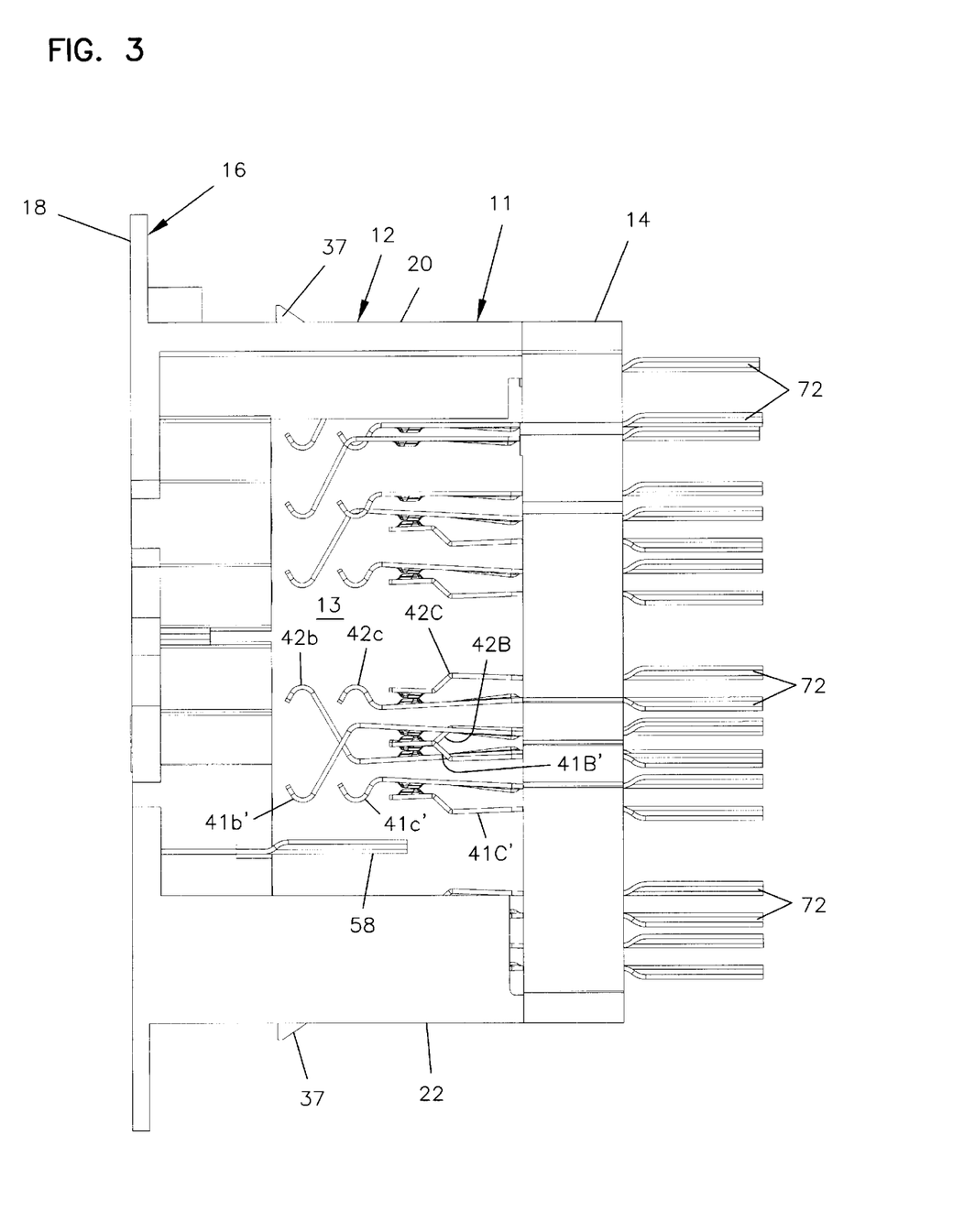
FIG. 3 is a right side elevation view of the module of FIG. 1.
Figure 4:
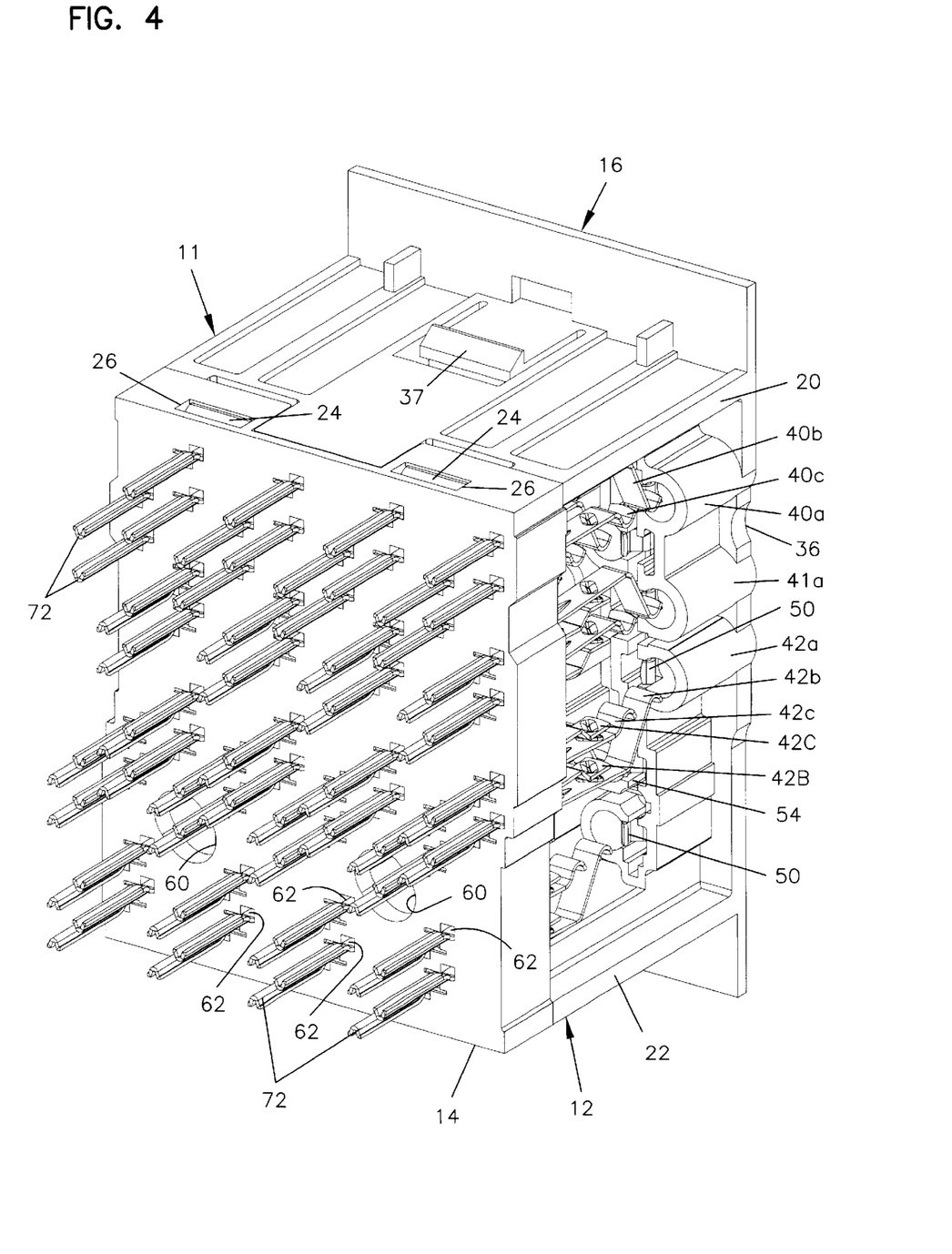
FIG. 4 is a rear, top and left side perspective view of the module of FIG. 1.

The back plate 14 includes a plurality of slots 62 formed therethrough. As will be more fully described, each of the slots 62 is sized and configured to retain and support an individual one of a plurality of spring contacts within the back plate 14. The spring contacts extending perpendicularly away from the back plate 14 toward the ports 40a–42a and 40a'–42a' to make electrical contact with a jack plug which may be inserted within any one of the ports. In FIGS. 3 and 5 only spring contacts associated with the first two arrays (i.e., the leftmost arrays shown in FIG. 2) for ease of illustration.

The spring contacts consist of conventional digital signal cross-connect (DSX) spring contacts and include a monitor ring contact 40b (FIG. 5) and a monitor tip contact 40c disposed along axis X'—X' to connect with the ring and tip (respectively and not shown) of a conventional jack plug inserted within port 40a. The spring contacts further include an OUT-ring contact 41b and an OUT-tip contact 41c positioned to engage the ring and tip (respectively and not shown) of a jack plug inserted within the OUT port 41. The spring contacts further include an IN-ring contact 42b and an IN-tip contact 42c positioned to electrically connect with the ring and tip (respectively and not shown) of a jack plug inserted within port 42.

As is conventional in DSX circuits, normal contacts 41B, 41C, 42C, 42B are positioned to make normal electrical contact with the springs 41b, 41c, 42c, 42b, respectively, in the absence of a jack plug inserted within the respective ports. Each of the ports has associated with it spring contacts as described.

The ports of an individual array constitute a DSX circuit such that the spring contacts and associated normal spring contacts (i.e., contacts 41b, 41B) are in normal electrical contact for a signal to flow between the contacts 41b, 41B in the absence of a plug inserted within the associated port 41. Upon insertion of a plug within the port 41, the spring contacts 41b are opened from the normal contacts 41B. Further, the spring contacts 40b, 40c of the monitor springs associated with the monitor port 40 are connected across a resistance with the respective ring and tip contacts 41b, 41c of the associated OUT port 41 as indicated by the schematic representation of a resistor 70, 70' on the faceplate 18. A plug inserted within the monitor ports 40, 40' permits monitoring of a signal carried on the OUT ports 41, 41' without interruption of the signal as is conventional in a DSX circuit.

Each of the spring contacts of each of the ports has an extending wire wrap termination pin 72 extending rearwardly from the back plate 14. It has previously been noted that the staggered relation of the ports permits a higher density of ports within a given transverse length of the module 10. Unfortunately, an increased density of ports (while desirable) would result in an increased density of wire wrap termination pins 72 on the back plate 14. The separation of the ports into the fields I, II and III permits the wire wrap termination pins 72 to be exposed in an open and more accessible layout as is apparent in the view of FIG. 4 such that tools can be used (as is well known in the art) to connect a wire to each of the wire wrap termination pins 72 in a conventional manner without undue interference from adjacent wire wrap termination pins 72.

With the foregoing, Applicant has demonstrated how enhanced density in a DSX module is attained by dividing the adjacent DSX circuits into offset arrays. In the preferred embodiment of FIGS. 1–6, fields II and III are completely separated from one another. In other words, there is no transverse overlap between fields containing ports 41, 42 and the fields III containing ports 41', 42'. As a result, there is enhanced spacing between the wire wrap termination pins 72 and less likelihood of interference between adjacent wire wrap termination pins 72.

Figure 7:
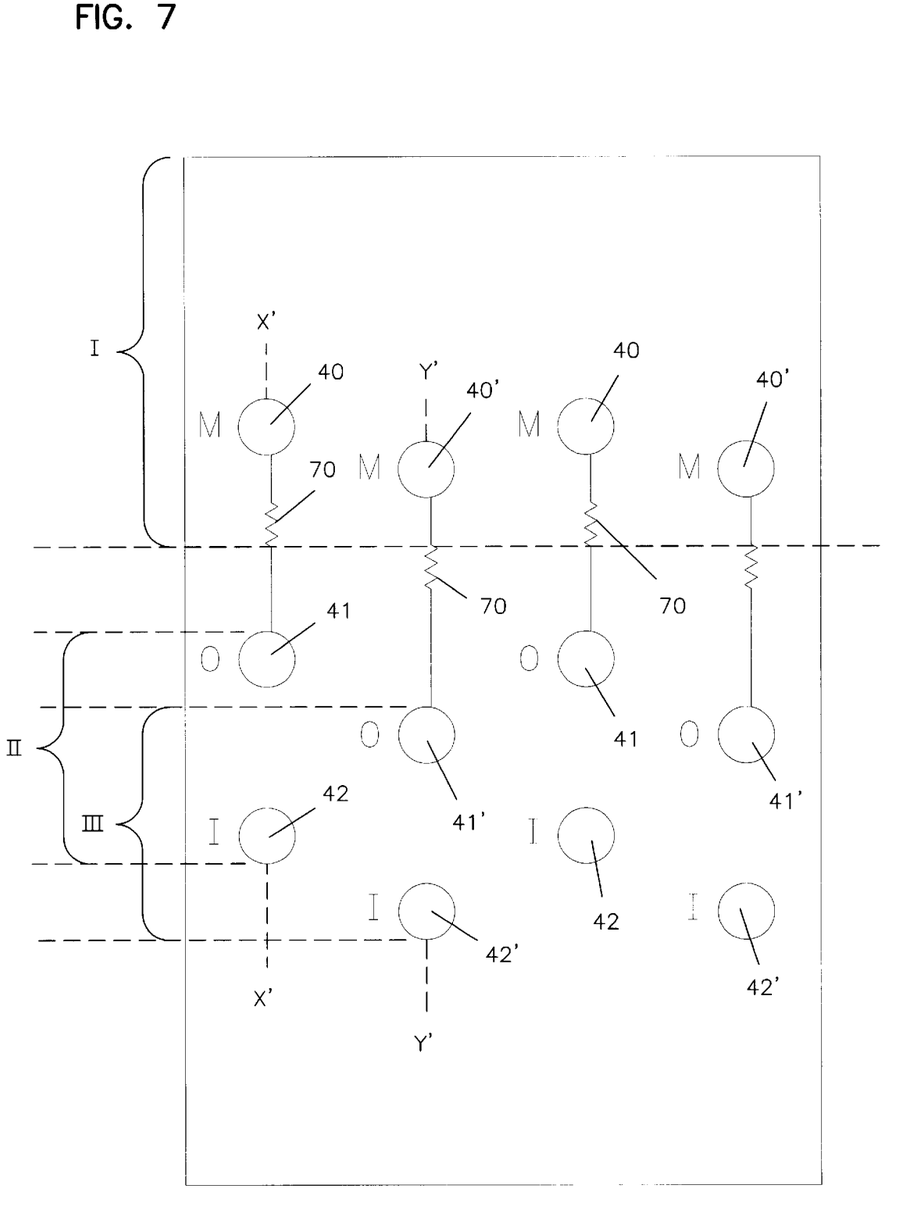
FIG. 7 is the view of FIG. 2 showing an alternative embodiment of the present invention.

In an alternate embodiment, the back plate 14 could be provided with a printed circuit board to route signals from the spring contacts to desired locations for eventual connection with external equipment. By thus eliminating the wire wrap termination pins 72, the fields II, III could overlap as illustrated in FIG. 7 with ports of adjacent arrays being vertically offset. With this arrangement, the desired transverse compactness of the module is attained. Further, the vertical dimension of the module can be reduced.

In FIGS. 1–6, eight arrays are shown. For ease of illustration, only four arrays are shown in FIG. 7. It will be appreciated that a module according to the present invention could have any number greater than two arrays.

Having described the present invention in the preferred embodiment, it is intended that modifications and equivalents of the disclosed concepts such as those which readily occur to one skilled in the art shall be included within the scope of the claims which are appended hereto.

We claim:

1. A digital signal cross-connect module comprising:

a dielectric faceplate having a plurality of ports formed therethrough with each of said ports sized to pass a jack plug of pre-determined dimensions;

said faceplate having upper and lower ends and spaced-apart side ends;

said plurality of ports including at least two linear arrays of said ports with each of said arrays including a monitor-jack port and at least two access ports;

each of said arrays extending linearly between said upper and lower ends and extending parallel to one another;

said plurality of ports defining at least three transverse fields of ports extending transversely between said side ends, said at least three fields of ports including a monitor field adjacent said upper end, a first access field adjacent said monitor field on a side thereof opposite said upper end and a second access field vertically offset from said first access field;

said plurality of ports positioned for monitor ports of said arrays to be disposed within said monitor field and with access ports of one of said arrays to be disposed within said first access field and with access ports of an adjacent array to be disposed within said second access field;

wherein monitor ports of adjacent arrays are transversely offset;

a grounding clip secured to said faceplate and having a plurality of ground springs connected thereto with each of said ground springs received within each of said ports and positioned to electrically engage a sleeve of a jack plug inserted within each of said ports, wherein said ground clip includes a wire-wrap termination end;

a one-piece dielectric back plate secured to said faceplate, said back plate including a plurality of slots, said slots including a plurality of linear arrays of said slots;

a plurality of contact springs secured to said back plate within said slots and extending toward said faceplate;

said plurality of contact springs including a plurality of pairs of tip springs and ring springs, each of said pairs aligned with respective ones of said plurality of ports for said tip springs and ring springs to electrically engage tip contacts and ring contacts, respectively, of jack plugs inserted within said ports, each of said contact springs including a wire-wrap termination end extending through said slots of said back plate on a side thereof opposite said faceplate, one array of said slots positioned to receive said plurality of pairs of tip springs and ring springs aligned with said ports of one of said arrays of ports.

2. A digital signal cross-connect module according to claim 1 wherein said second access field is adjacent said first access field and is positioned between said first access field and said lower end.

3. A digital signal cross-connect module comprising:

a molded dielectric faceplate having a plurality of ports formed therethrough with each of said ports sized to pass a jack plug of pre-determined dimensions;

said faceplate having upper and lower ends and spaced-apart side ends;

said plurality of ports including a plurality of arrays of said ports, with each of said arrays including a monitor-jack port and at least two access ports;

each of said arrays extending between said upper and lower ends;

a molded dielectric back plate secured to said faceplate, said back plate including a plurality of slots, said slots defining a plurality of arrays of slots;

a plurality of contact springs positioned through said slots and secured to said back plate and extending toward said faceplate;

each of said contact springs including a wire-wrap termination end extending through said slots of said back plate on a side thereof opposite said faceplate;

said plurality of contact springs including a plurality of pairs of tip springs and ring springs, each of said pairs aligned with respective ones of said plurality of ports for said tip springs and ring springs to electrically engage tip contacts and ring contacts, respectively, of jack plugs inserted within said ports, one array of said slots positioned to receive said plurality of pairs of tip and ring springs aligned with said ports of one of said arrays of ports.

4. A digital signal cross-connect module according to claim 3 wherein said plurality of arrays of said ports are arranged in pairs of said arrays, said module including a plurality of said pairs of said arrays and further comprising a grounding clip for each of said pairs of said arrays, each of said grounding clips secured to said faceplate and having a plurality of ground springs connected thereto with each of said ground springs received within each of said ports and positioned to electrically engage a sleeve of a jack plug inserted within each of said ports, and a ground bus clip secured to said faceplate and electrically connected to each of said grounding clips, wherein said arrays of ports are generally linear, said grounding clips extending generally parallel to said linear arrays, said ground bus clip extending generally perpendicularly to said linear arrays.

5. A digital signal cross-connect module according to claim 4 wherein said ground bus clip includes a wire-wrap termination end.

6. A digital signal cross-connect module according to claim 5 wherein said back plate includes an opening aligned with said wire-wrap termination end of said ground bus clip.

7. A digital signal cross-connect module according to claim 4 wherein said faceplate includes an elongated slot positioned between each of said pairs of said arrays, each of said grounding clips positioned in one of said slots.

8. A digital signal cross-connect module according to claim 3 wherein each of said contact springs includes a stop for engaging a side of said back plate facing said faceplate.

9. A digital signal cross-connect module according to claim 4, wherein said ground bus clip includes two wire-wrap termination ends, and said back plate includes two openings, each opening aligned with one of said wire-wrap termination ends of said ground bus clip.

10. A digital signal cross-connect module comprising:

a molded dielectric faceplate having a plurality of ports formed therethrough with each of said ports sized to pass a jack plug of pre-determined dimensions;

said faceplate having upper and lower ends and spaced-apart side ends;

said plurality of ports including a plurality of arrays of said ports, with each of said arrays including a monitor-jack port and at least two access ports;

each of said arrays extending between said upper and lower ends;

a dielectric back plate secured to said faceplate;

a plurality of contact springs secured to said back plate and extending toward said faceplate;

each of said contact springs including a wire-wrap termination end extending through said back plate to a side thereof opposite said faceplate;

said plurality of contact springs including a plurality of pairs of tip springs and ring springs, each of said pairs aligned with respective ones of said plurality of ports for said tip springs and ring springs to electrically engage tip contacts and ring contacts, respectively, of jack plugs inserted within said ports;

wherein said plurality of arrays of said ports are arranged in pairs of said arrays, said module including a plurality of said pairs of said arrays and further comprising a grounding clip for each of said pairs of said arrays, each of said grounding clips secured to said faceplate and having a plurality of ground springs connected thereto with each of said ground springs received within each of said ports and positioned to electrically engage a sleeve of a jack plug inserted within each of said ports;

wherein said faceplate includes an elongated slot positioned between each of said pairs of said arrays, each of said grounding clips positioned in one of said slots.

* * * * *